United States Patent [19]

Achleitner

[11] Patent Number: 4,834,417
[45] Date of Patent: May 30, 1989

[54] WHEEL SUSPENSION

[75] Inventor: August Achleitner, Weil der Stadt, Fed. Rep. of Germany

[73] Assignee: Dr. Ing. h.c.F. Porsche Aktiengesellachaft, Stuttgart, Fed. Rep. of Germany

[21] Appl. No.: 154,296

[22] Filed: Feb. 10, 1988

[30] Foreign Application Priority Data

Feb. 10, 1987 [DE] Fed. Rep. of Germany ....... 3704019

[51] Int. Cl.$^4$ .............................................. B60K 17/30
[52] U.S. Cl. .................................... 280/696; 280/666
[58] Field of Search ............... 280/666, 670, 690, 696, 280/701

[56] References Cited

U.S. PATENT DOCUMENTS

| | | | |
|---|---|---|---|
| 3,630,303 | 12/1971 | Froumajou | 280/666 |
| 4,377,298 | 3/1983 | Finn et al. | 280/696 |
| 4,538,831 | 9/1985 | Kami et al. | 280/696 |

Primary Examiner—Charles A. Marmor
Assistant Examiner—Ross Weaver

[57] ABSTRACT

A wheel suspension for a motor vehicle, especially with four-wheel drive and at least one guide member which underneath an axle drive shaft is pivotally supported on the side of the body and connected with a wheel carrier. A spring leg is arranged between the guide member and the vehicle body which is extended laterally past the drive shaft by means of a connecting element adjoining the spring leg cylinder and is pivotally connected with the lower guide member in a bearing support. The connecting element of the spring leg includes a groove-shaped recess extending transversely with respect to the drive shaft, in which the drive shaft is arranged immersing with a longitudinal section and having a spacing for movement. This offers the advantage that the drive shaft can be easily installed without having to disconnect the spring leg from the drive member.

12 Claims, 3 Drawing Sheets

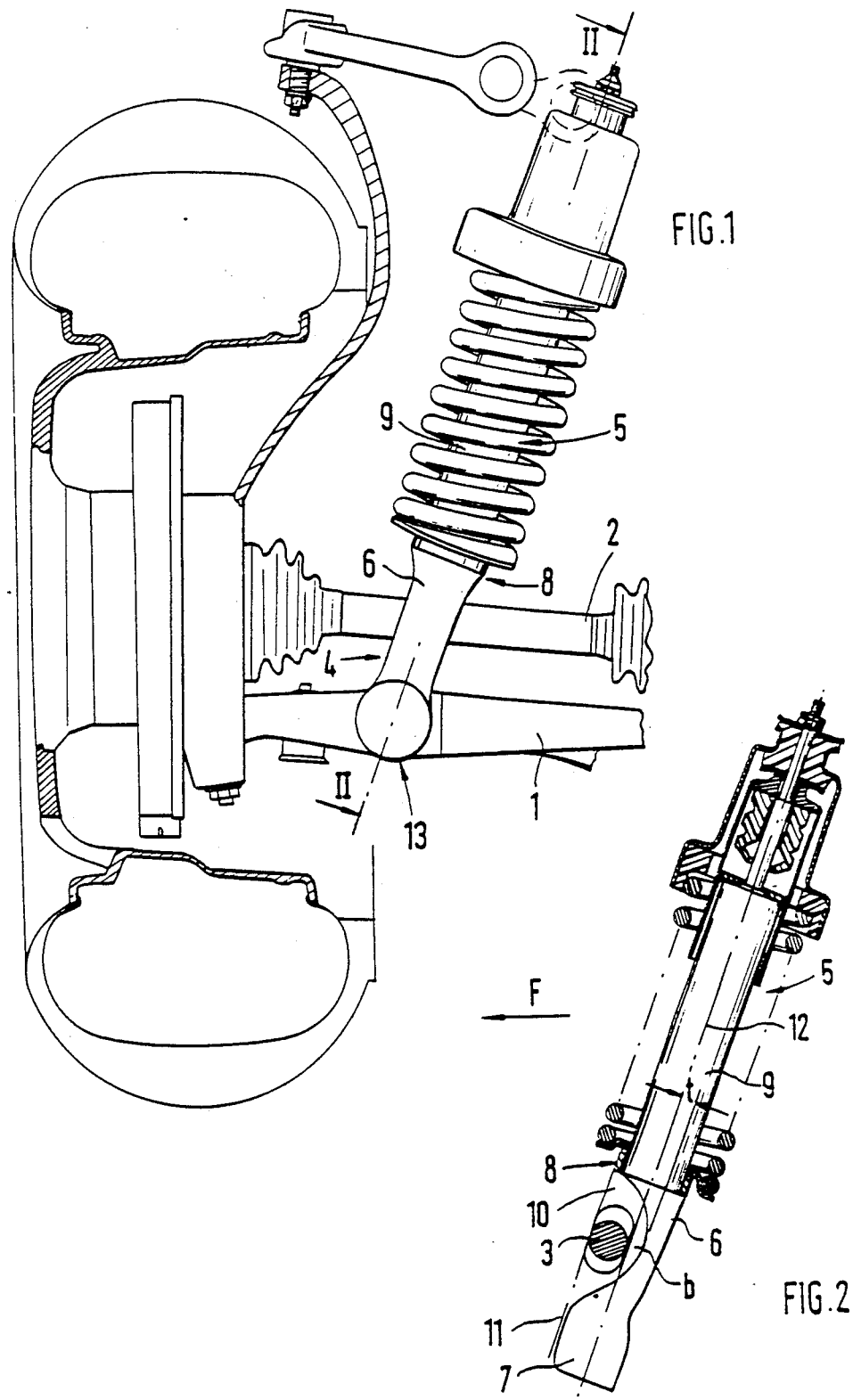

WHEEL SUSPENSION

BACKGROUND AND SUMMARY OF THE INVENTION

The present invention relates to a wheel suspension for a motor vehicle, especially with four-wheel drive and with at least one guide member which is pivotally supported on the body side underneath an axle drive shaft, especially of a front wheel axle drive shaft, and is connected with a wheel carrier, and in which a spring leg is arranged between the guide member and the vehicle body which is extended laterally past the drive shaft by means of a connecting element adjoining the spring leg cylinder and which is pivotally retained with the lower guide member in a bearing support.

A wheel suspension with a shock absorber is disclosed in the DE-OS 26 33 402 which is provided with an indentation in its cylindrical tubular part in order that an axle drive shaft can be extended without impairment close to the shock absorber. Indentations in the cylindrical tubular part of the absorber are possible in the outer tubular part with two tube-type shock absorbers. In contrast, such indentations can be provided only within a certain area with single tube-type shock absorbers by reason of the movable piston in the cylinder of the shock absorber or damper and this provision of the indentation at the tubular part guiding the piston can be carried out only with a considerable expenditure. A wheel suspension with a spring leg is described in the DE-OS 33 42 355 which includes a connecting element coordinated to a lower guide member. This connecting element is constructed as fork in such a manner that an axle drive shaft can be extended through two fork prongs. With such a construction limiting the drive shaft on both sides, it is costly to install and disassemble the drive shaft rapidly and in a simple manner because, in that case, the lower end of the connecting element forming the fork must be detached from the guide member.

The present invention is concerned with the task to provide a wheel suspension of the aforementioned type in which an axle drive shaft is to be arranged unimpaired by a spring leg and an assembly and disassembly of the axle drive shaft is simplified.

The underlying problems are solved according to the present invention in that the connecting element of the spring leg includes a groove-shaped recess extending transversely with respect to the drive shaft, in which the shaft is arranged immersing with a longitudinal section with a spacing for movement.

The principal advantages achieved with the present invention reside in that owing to the groove-shaped recess in the connecting element, which is open toward the axle drive shaft, the shaft can assume a position inside of the circumferential contour of the element, whereby the connecting element itself has no significantly larger diameter than the cylindrical part of the spring leg. The recess, which is open toward the outside, also enables a simple and quick assembly of the axle drive shaft without having to disconnect the connecting element, respectively, the spring leg from the lower guide member.

The connecting element is preferably so constructed that a bearing part at the end thereof is arranged concentric to the cylindrical tubular part of the spring leg.

In particular, the recess is constructed so large that the movement of the axle drive shaft is not impaired during wheel movements and a sufficient spacing is provided between this shaft and the recess. As the wheel movement and the steering movements resulting therefrom are known, the contour of the recess can be constructed corresponding to the possible movements of the shaft. In one embodiment according to this invention, this can be achieved in that the recess in the connecting element is constructed arcuately shaped.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a front elevational view of a wheel suspension in accordance with the present invention with an axle drive shaft extended past a connecting element of a spring leg;

FIG. 2 is a cross-sectional view taken along line II—II of FIG. 1;

DETAILED DESCRIPTION OF THE DRAWINGS

Figure 3:
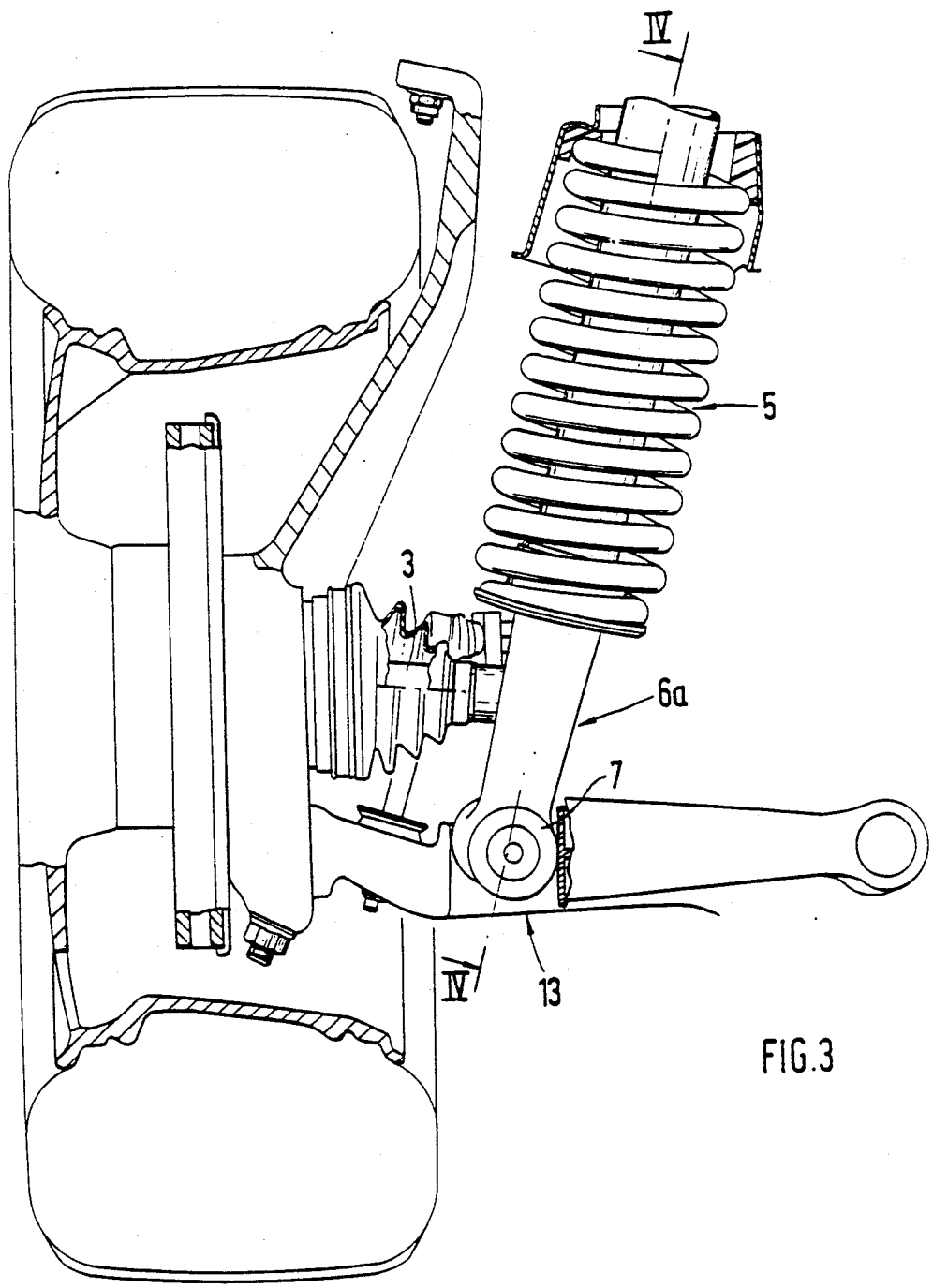
FIG. 3 is a front elevational view of a modified embodiment of a connecting element in accordance with the present invention at a spring leg with a tub-shaped recess.

Referring now to the drawing wherein like reference numerals are used throughout the various views to designate like parts, a wheel suspension for a motor vehicle includes a cross guide member 1 which is arranged underneath an axle drive shaft 2 and on which a lower end 4 (FIG. 1) of a spring leg 5 is pivotally supported by way of a joint 13. This lower end 4 consists according to FIGS. 1 and 2 of a connecting element 6 which, at its end, carries a joint, respectively, a bearing part 7 and is fixedly connected at its oppositely disposed end 8 to the cylindrical part 9 of the spring leg 5.

As shown in particular in FIG. 2, the connecting element 6 includes—in relation to the vehicle—a transversely extending groove-shaped recess 10 which is constructed arcuately shaped. Within this recess, the shaft 3 is so arranged with play b that it lies approximately inside the outer contour 11 of the connecting element 6. The recess 10 extends in relation to the shaft 3 beyond the longitudinal center axis 12 of the spring leg 5 so that the shaft 3 adjoins directly the longitudinal center axis 12 (FIG. 2).

Figure 4A:
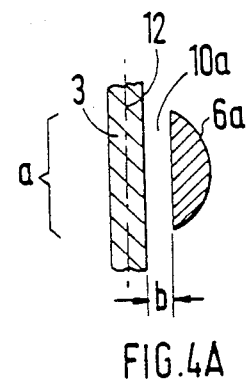
FIG. 4a is a cross-sectional view taken along line V—V of FIG. 4.
Figure 4:
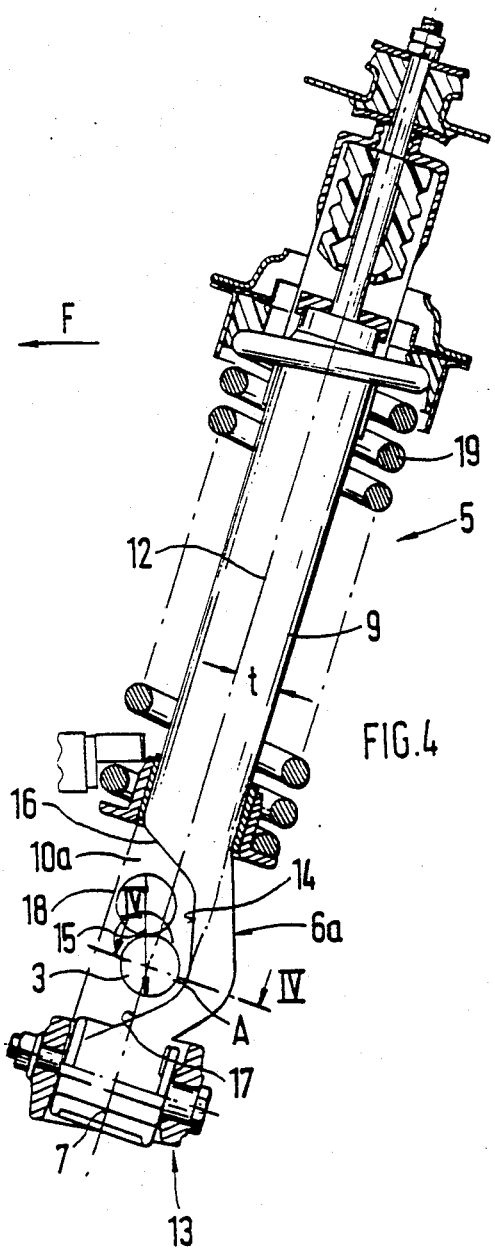
FIG. 4 is a cross-sectional view taken along line IV—IV of FIG. 3.

According to a further embodiment of the present invention, as illustrated in FIGS. 3 and 4, the connecting element 6a includes—in relation to the vehicle—a transversely extending groove-shaped recess 10a. This recess 10a is constructed tub-shaped and includes a base surface 14 which extends approximately parallel to the possible movement path 15 of the drive shaft 3 as is shown more fully in FIG. 4. An upper lateral surface 16 and a lower lateral surface 17 adjoin this base surface 14 which surround the shaft 3 on two sides. The tub-shaped recess 10a has preferably such a depth that the shaft 3 is arranged in a lower position A directly concentrically to the center longitudinal axis 12. The connecting element 6a is located in this embodiment inside the outer contour of the coil spring 19.

Figure 5:
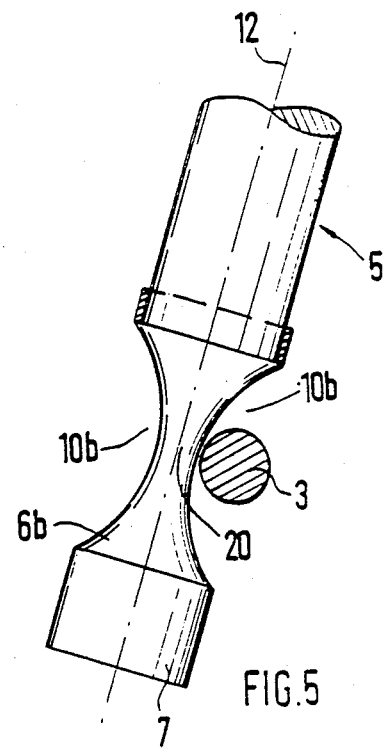
FIG. 5 is a partial elevational view of a further modified embodiment of a connecting element with two recesses in accordance with the present invention.

According to a further embodiment illustrated in FIG. 5, the connecting element 6b is provided with a recess 10b on both sides thereof which forms therebetween a concentric part 20 with respect to the spring leg 5. Owing to such a construction of the connecting element 6b with the recesses 10b, the spring leg 5 can be so installed that no attention needs to be paid to the position of the recess 10b and it can be arranged at the same time close to further more closely adjoining parts.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A wheel suspension for a motor vehicle, comprising at least one guide member which is pivotally supported on the body side underneath an axle drive shaft and is operatively connected with a wheel carrier means, spring leg means arranged between the guide member and the vehicle body including a single connecting element extending laterally past the drive shaft and pivotally connected with the lower guide member in a bearing support means to provide for a one point connection of the connecting element to the guide member, the connecting element of the spring leg means being provided with a groove-shaped recess means extending transversely to the drive shaft in which is arranged the shaft immersing with a longitudinal section and having a movement spacing.

2. A wheel suspension according to claim 1, wherein the recess means in the connecting element is constructed arcuately shaped.

3. A wheel suspension for a motor vehicle, comprising at least one guide member which is pivotally supported on the body side underneath an axle drive shaft and is operatively connected with a wheel carrier means, spring leg means arranged between the guide member and the vehicle body including a connecting element extending laterally past the drive shaft and pivotally connected with the lower guide member in a bearing support means, the connecting element of the spring leg means being provided with a groove-shaped recess means extending transversely to the drive shaft in which is arranged the shaft immersing with a longitudinal section and having a movement spacing, wherein the recess means in the connecting element is constructed tub-shaped and includes a base surface extending approximately parallel to the approximately vertical movement path of the shaft, and two lateral surfaces extending partially about the shaft and adjoining the surface.

4. A wheel suspension according to claim 1, wherein the recess means has a depth extending beyond the longitudinal center axis of the spring leg means and the shaft is arranged near the longitudinal center axis.

5. A wheel suspension according to claim 1, wherein the recess means has such a depth that the cross-sectional surface of the drive shaft lies inside the outer contour of the connecting element and the connecting element corresponds approximately to the diameter of the spring leg cylinder, respectively, its coil spring.

6. A wheel suspension for a motor vehicle, comprising at least one guide member which is pivotally supported on the body side underneath an axle drive shaft and is operatively connected with a wheel carrier means, spring leg means arranged between the guide member and the vehicle body including a connecting element extending laterally past the drive shaft and pivotally connected with the lower guide member in a bearing support means, the connecting element of the spring leg means being provided with a groove-shaped recess means extending transversely to the drive shaft in which is arranged the shaft immersing with a longitudinal section and having a movement spacing, and wherein a recess means is arranged in the connecting element on both sides of a plane extending through the longitudinal center axis of the spring leg means, which recess means form a constriction with a concentrically arranged part.

7. A wheel suspension according to claim 1, wherein a bearing part is arranged at the free end of the connecting element which is connected with the part forming the recess means and is arranged concentric to the cylinder of the spring leg means.

8. A wheel suspension according to claim 4, wherein the recess means in the connecting element is constructed arcuately shaped.

9. A wheel suspension according to claim 4, wherein the recess means in the connecting element is constructed tub-shaped and includes a base surface extending approximately parallel to the approximately vertical movement path of the shaft, and two lateral surfaces extending partially about the shaft and adjoining the base surface.

10. A wheel suspension according to claim 7, wherein the recess means has such a depth that the cross-sectional surface of the drive shaft lies inside the outer contour of the connecting element and the connecting element corresponds approximately to the diameter of the spring leg cylinder, respectively, its coil spring.

11. A wheel suspension for a motor vehicle, comprising at least one guide member which is pivotally supported on the body side underneath an axle drive shaft and is operatively connected with a wheel carrier means, spring leg means arranged between the guide member and the vehicle body including a connecting element extending laterally past the drive shaft and pivotally connected with the lower guide member in a bearing support means, the connecting element of the spring leg means being provided with a groove-shaped recess means extending transversely to the drive shaft in which is arranged the shaft immersing with a longitudinal section and having a movement spacing, and wherein a recess means is arranged in connecting element on both sides of a plane extending through the longitudinal center axis of the spring leg means, which recess means form a constriction with a concentrically arranged part, and wherein a bearing part is arranged at the free end of the connecting element which is connected with the part forming the recess means and is arranged concentric to the cylinder of the spring leg means.

12. A wheel suspension according to claim 7, wherein the recess means has a depth extending beyond the longitudinal center axis of the spring leg means and the shaft is arranged near the longitudinal center axis.

* * * * *